Patented Dec. 21, 1943

UNITED STATES PATENT OFFICE 2,337,492

MANUFACTURE OF HIGH ANTIKNOCK HYDROCARBONS

Ernest F. Pevere, Beacon, Louis A. Clarke, Fishkill, and George B. Hatch, Beacon, N. Y., assignors, by mesne assignments, to The Texas Company, New York, N. Y., a corporation of Delaware No Drawing. Application April 11, 1940, Serial No. 329,072

11 Claims. (Cl. 260—683.4)

This invention relates to the manufacture of high anti-knock hydrocarbons and particularly to the manufacture of hydrocarbons suitable for safety fuel.

Broadly, the invention contemplates the manufacture of motor fuel by reacting an isoparaffin hydrocarbon, such as isopentane, with a high molecular weight olefin hydrocarbon in the presence of an activated aluminum halide catalyst at relatively low temperatures.

More specifically the invention contemplates reacting the isoparaffin hydrocarbon with an olefin having around 8 to 16 carbon atoms per molecule, and particularly a highly branched chain olefin hydrocarbon. The olefin hydrocarbons may comprise polymers obtained in the polymerization of lower molecular weight olefins having 3 to 5 carbon atoms per molecule.

The invention has particular application to the preparation of safety fuel by reacting isopentane with di-isobutylene, tri-isobutylene, or a mixture containing them, by contact with aluminum chloride and a small amount of hydrogen chloride, so as to produce a product of reaction containing a large proportion of hydrocarbons having a high anti-knock value and boiling within the range of safety fuel.

It has been discovered that an isoparaffin, such as isopentane and an olefin hydrocarbon, such as di- or tri-isobutylene, reacts in the presence of aluminum chloride and a small amount of hydrogen chloride at relatively low temperatures, for example, around minus 10° F. to plus 10° F., to produce hydrocarbons of high anti-knock value, a large proportion of which falls within the range suitable for safety fuel. The boiling range for safety fuel is around 300° to 400° F., but may range from around 285° to 500° F. or higher, and is characterized by having a flash point not below 105° F.

The nature of the specific reaction or reactions involved is not definitely known. It is thought that during the course of the reaction hydrogen transfers from the isoparaffin to the olefin or polymer. The removal of hydrogen from the isoparaffin, such as isopentane, leaves the remaining hydrocarbon radical in an active state such that it combines with another isoparaffin or radical thereof to form, in the case of isopentane, a branched chain decane. Transfer of the hydrogen to the olefin or polymer results in saturation. Thus, a substantially saturated branched chain hydrocarbon product of unusually high anti-knock properties for its boiling range, is produced.

In any case, it has been found that at temperatures below minus 40° F. there appears to be little, if any, reaction between isopentane and tri-isobutylene in the presence of aluminum chloride. On the other hand, at higher temperatures, up to 20° F., there is substantial reaction, the best results being obtained at around minus 10° to plus 10° F., from the standpoint of production of hydrocarbons boiling within the range 285° to 400° F. At 20° F. and above the proportion of low boiling hydrocarbons produced is apparently increased at the expense of those hydrocarbons suitable for safety fuel.

In carrying out a batch type of procedure one part by weight of anhydrous aluminum chloride was charged to a closed reaction vessel, to which was also charged about five or six parts of isopentane. The contents of the vessel were subjected to agitation and the vessel was cooled so as to maintain a reaction temperature of around 0° F.

A small amount of water, namely, about 4% by weight of the aluminum chloride, was added to the mixture, as was also one part by weight of tri-isobutylene. The tri-isobutylene was added slowly, over a period of about 60 minutes, with agitation. Upon completion of the addition the agitation was continued for about 30 minutes.

The reaction mixture was then removed and neutralized by washing with an alkaline solution. The neutralized product was then fractionated into fractions, namely a pentane and lighter fraction, boiling up to about 86° F., a gasoline fraction boiling over the range 86° to 285° F., a safety fuel fraction boiling over the range 285° to 400° F., and a residual fraction boiling above 400° F.

The liquid products obtained, exclusive of the pentane and lighter hydrocarbons, amounted to 178% by weight on the basis of the tri-isobutylene charge. The yields and characteristics of these liquid fractions were as follows:

Gasoline fraction:
    Per cent by volume of depentanized product_____ 24.5
    Per cent by weight basis olefin_____ 41.0
    Bromine No_____ 0
    Octane No. (C. F. R. M.)_____ 87.7

Safety fuel fraction:
    Per cent by volume of depentanized product_____ 60.3
    Per cent by weight basis olefin_____ 105
    Bromine No_____ 6
    Octane No. (C. F. R. M.)_____ 91.5

Residue:
    Per cent by volume of depentanized product_____ 13.9
    Per cent by weight basis olefin_____ 32.0
    Bromine No_____ 38
    Octane No. (C. F. R. M.)_____ ____

As indicated by the foregoing data, the safety fuel fraction amounted to 60.3% by volume of the depentanized product, or 105% by weight of the tri-isobutylene charged to the reaction vessel.

While a batch type of operation has been described in detail, it is, of course, contemplated that a continuous type of operation may be employed. The catalyst may be supported in the reaction tower in lump or granular form, or it may be suspended or dissolved in a suitable fluid vehicle, such as the liquid complex formed by the reaction of aluminum chloride with hydrocarbons.

In a continuous type of operation it is contemplated that provision should be made for recycling unreacted hydrocarbons or of portions of the reaction mixture, as may be desired. For example, it may be desirable to recycle to the reaction vessel the higher boiling products contained in the aforementioned residual fraction.

Instead of aluminum chloride, other aluminum halides, such as aluminum bromide, may be employed. Other hydrogen halides, besides hydrogen chloride, may be used to activate the aluminum halide catalyst.

While the reaction between isopentane and tri-isobutylene has been described above, it is also contemplated that hydrocarbon mixtures or fractions consisting essentially of isopentane and di- or tri-isobutylene may be charged to the reaction. It is particularly desirable to use branched chain olefins or polymers as the olefin feed to the process since they result in the production of saturated hydrocarbons boiling within the range for safety fuel and possessing a high anti-knock value.

Suitable olefins for the charge comprise butylene polymers, cross polymers of normal and iso butylene, isobutylene polymers, mixed $C_3$ and $C_4$ polymers, pentene polymers, particularly those having 10 to 15 carbon atoms per molecule, and mixtures of any two or more of these polymers.

While isopentane has been mentioned as a suitable isoparaffin, it is contemplated that the isoparaffin charge may include isoparaffins having 4 to 5 carbon atoms per molecule.

In carrying out the reaction the temperature may range from minus 40° F. to plug 30° F., but is preferably in the range minus 10° to 10° F.

Also it is important to have present an excess of the isoparaffin. The molal ratio of isoparaffin to olefin should be preferably about 5 to 10 molal parts of isoparaffin to 1 part of olefin.

In a continuous method of operation the ratio of catalyst to hydrocarbons being treated is around 0.2 to 1 parts by volume of catalyst to 1 part of hydrocarbons in the reaction zone. The time of contact between hydrocarbons and the catalyst may range from around 10 to 60 minutes.

Obviously many modifications and variations of the invention, as hereinbefore set forth, may be made without departing from the spirit and scope thereof and therefore only such limitations should be imposed as are indicated in the appended claims.

We claim:

1. In the manufacture of safety fuel boiling within the range of 285–500° F. and higher having a flash point not below 105° F. and a high anti-knock value, the method which comprises reacting an isoparaffin selected from the group consisting of isopentane and isobutane with an olefin polymer having 8 to 16 carbon atoms per molecule selected from the group consisting of isobutylene polymers, butylene polymers, cross polymers of normal and isobutylene, mixed $C_3$ and $C_4$ olefin polymers, $C_5$ olefin polymers and mixtures thereof, with the isoparaffin present in the reaction in the proportion of at least five molar parts to one part of the olefin, in the presence of a catalyst consisting as the essential active constituents of a relatively large amount of aluminum halide and a minor amount of hydrogen halide at a temperature within the range of —10° F. to +20° F., whereby isoparaffin is reacted with the olefin polymer to produce a total liquid product which contains, on the basis of the depentanized product, a major proportion by volume boiling within the range of 285–400° F., said 285–400° F. fraction having a C. F. R. M. clear octane of at least about 90 and being substantially saturated.

2. The method according to claim 1, wherein the aluminum halide is aluminum chloride, and the hydrogen halide is HCl.

3. In the manufacture of safety fuel boiling within the range of 285–500° F. and higher having a flash point not below 105° F. and of high anti-knock value, the method which comprises reacting an isoparaffin selected from the group consisting of isopentane and isobutane with a butylene trimer, with the isoparaffin present in the reaction in the proportion of at least five molar parts to one part of the butylene trimer, in the presence of a catalyst consisting as the essential active constituents of a relatively large amount of aluminum chloride and a minor amount of hydrogen chloride at a temperature within the range of —10° F. to +20° F., whereby isoparaffin is reacted with the butylene trimer to produce a total liquid product which contains, on the basis of the depentanized product, a major proportion by volume boiling within the range of 285–400° F., said 285–400° F. fraction having a C. F. R. M. clear octane of at least about 90 and being substantially saturated.

4. In the manufacture of safety fuel boiling within the range of 285–500° F. and higher having a flash point not below 105° F. and of high anti-knock value, the method which comprises reacting an isoparaffin selected from the group consisting of isopentane and isobutane with a butylene dimer, with the isoparaffin present in the reaction in the proportion of at least five molar parts to one part of the butylene dimer, in the presence of a catalyst consisting as the essential active constituents of a relatively large amount of aluminum chloride and a minor amount of hydrogen chloride at a temperature within the range of —10° F. to +20° F., whereby isoparaffin is reacted with the butylene dimer to produce a total liquid product which contains, on the basis of the depentanized product, a major proportion by volume boiling within the range of 285–400° F., said 285–400° F. fraction having a C. F. R. M. clear octane of at least about 90 and being substantially saturated.

5. The method according to claim 3 wherein the btuylene trimer is tri-isobutylene.

6. The method according to claim 4 wherein the butylene dimer is di-isobutylene.

7. In the manufacture of safety fuel boiling within the range of 285–500° F. and higher, having a flash point not below 105° F. and of high anti-knock value, the method which comprises reacting an isoparaffin selected from the group consisting of isopentane and isobutane with an isobutylene polymer fraction consisting essentially of tri-isobutylene and di-isobutylene, with the isoparaffin present in the reaction in the proportion of at least five molar parts to one part of the isobutylene polymer, in the presence of a catalyst consisting as the essential active constituents of a relatively large amount of aluminum chloride and a minor amount of hydrogen chloride at a temperature within the range of −10° F. to +20° F., whereby isoparaffin is reacted with the isobutylene polymer fraction to produce a total liquid product which contains, on the basis of the depentanized product, a major proportion by volume boiling within the range of 285–400° F., said 285–400° F. fraction having a C. F. R. M. clear octane of at least about 90 and being substantially saturated.

8. In the manufacture of safety fuel boiling within the range of 285–500° F. and higher, having a flash point not below 105° F. and a high anti-knock value, the method which comprises reacting isopentane with tri-isobutylene, with the isopentane present in the reaction in the proportion of at least five molar parts to one part of the tri-isobutylene, in the presence of a catalyst consisting as the essential active constituents of a relatively large amount of aluminum chloride and a minor amount of hydrogen chloride at a temperature within the range of −10° F. to +20° F., whereby isopentane is reacted with the tri-isobutylene to produce a total liquid product which contains, on the basis of the depentanized product, at least about 60% by volume boiling within the range of 285–400° F., said 285–400° F. fraction having a C. F. R. M. clear octane of at least about 90 and being substantially saturated.

9. In the manufacture of safety fuel boiling within the range of 285–500° F. and higher, having a high anti-knock value, the method which comprises reacting isopentane with an olefin polymer having 8 to 16 carbon atoms per molecule, obtained in the polymerization of 3 to 5 carbon atom olefins, in the presence of aluminum chloride and hydrogen chloride under conditions of low temperature of the order of −10° F. to +20° F. and high molar ratio of isopentane-to-olefin polymer, such that a predominant reaction of the process consists of transfer of hydrogen from the isoparaffin to the olefin polymer to saturate the latter and a combination of two isoparaffin radicals from which hydrogen has been removed to form a higher boiling isoparaffinic hydrocarbon, whereby a total liquid product is produced which contains, on the basis of the depentanized product, a major proportion by volume boiling within the range of 285–400° F., said 285–400° F. fraction having a C. F. R. M. clear octane of at least about 90 and being substantially saturated.

10. The method according to claim 9, wherein the olefin polymer is a C₄ olefin polymer.

11. The method according to claim 9, wherein the olefin polymer is tri-isobutylene.

ERNEST F. PEVERE.
LOUIS A. CLARKE.
GEORGE B. HATCH.